United States Patent
Kelly et al.

(10) Patent No.: US 10,107,965 B2
(45) Date of Patent: Oct. 23, 2018

(54) FIBER OPTIC WALL PLATE WITH REDUNDANCY SYSTEM

(71) Applicant: CommScope Technologies LLC, Hickory, NC (US)

(72) Inventors: Sean Patrick Kelly, York, PA (US); Craig B. Kegerise, Middletown, PA (US)

(73) Assignee: CommScope Technologies LLC, Hickory, NC (US)

( * ) Notice: Subject to any disclaimer, the term of this patent is extended or adjusted under 35 U.S.C. 154(b) by 245 days.

(21) Appl. No.: 13/720,505

(22) Filed: Dec. 19, 2012

(65) Prior Publication Data
US 2013/0163984 A1    Jun. 27, 2013

Related U.S. Application Data

(60) Provisional application No. 61/579,334, filed on Dec. 22, 2011.

(51) Int. Cl.
*G02B 6/28* (2006.01)
*H04B 10/038* (2013.01)
*H04B 10/032* (2013.01)

(52) U.S. Cl.
CPC .......... *G02B 6/28* (2013.01); *H04B 10/032* (2013.01); *H04B 10/038* (2013.01)

(58) Field of Classification Search
CPC .. G02B 6/4452; G02B 6/3897; G02B 6/4471; G02B 6/46; G02B 6/3825; H04B 10/032; H04B 10/038
See application file for complete search history.

(56) References Cited

U.S. PATENT DOCUMENTS

| | | | | |
|---|---|---|---|---|
| 4,630,886 A | * | 12/1986 | Lauriello et al. | 385/135 |
| 5,204,921 A | * | 4/1993 | Kanai et al. | 385/17 |
| 5,539,564 A | | 7/1996 | Kumozaki et al. | |
| 6,256,443 B1 | * | 7/2001 | Uruno et al. | 385/134 |
| 6,483,902 B1 | * | 11/2002 | Stewart | H04L 12/2803 379/171 |
| 6,725,303 B1 | * | 4/2004 | Hoguta | H04Q 3/0016 709/227 |

(Continued)

FOREIGN PATENT DOCUMENTS

| | | |
|---|---|---|
| EP | 1 746 858 A1 | 1/2007 |
| EP | 2 313 998 B1 | 9/2012 |
| WO | WO 2005/117300 A1 | 12/2005 |

OTHER PUBLICATIONS

International Search Report and Written Opinion for PCT/US2012/070299 dated Apr. 23, 2013.

(Continued)

*Primary Examiner* — Thomas A Hollweg
*Assistant Examiner* — Mary A El Shammaa
(74) *Attorney, Agent, or Firm* — Merchant & Gould P.C.

(57) ABSTRACT

An optical splitter/coupler may be disposed at a subscriber network access location to provide primary and back-up service to the subscriber network access location. The optical splitter/coupler includes first and second optical fibers that are optically coupled to a third optical fiber. The first and second optical fibers of the optical splitter/coupler are optically coupled to a service provider location. The third optical fiber is optically coupled to the subscriber network access location.

16 Claims, 6 Drawing Sheets

(56) References Cited

U.S. PATENT DOCUMENTS

| | | |
|---|---|---|
| 6,983,095 B2 | 1/2006 | Reagan et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 7,369,741 B2 | 5/2008 | Reagan et al. |
| 7,400,816 B2 | 7/2008 | Reagan et al. |
| 7,407,330 B2 | 8/2008 | Smith et al. |
| 7,418,181 B2 | 8/2008 | Zimmel et al. |
| 7,444,056 B2 | 10/2008 | Allen et al. |
| 7,457,503 B2 | 11/2008 | Solheid et al. |
| 7,471,869 B2 | 12/2008 | Reagan et al. |
| 7,515,805 B2 | 4/2009 | Vongseng et al. |
| 7,519,259 B2 | 4/2009 | Smith et al. |
| 7,546,018 B2 * | 6/2009 | Hendrickson et al. ....... 385/135 |
| 7,606,459 B2 | 10/2009 | Zimmel et al. |
| 7,809,232 B2 | 10/2010 | Reagan et al. |
| 7,809,233 B2 | 10/2010 | Smith et al. |
| 7,809,234 B2 | 10/2010 | Smith et al. |
| 7,809,235 B2 | 10/2010 | Reagan et al. |
| 7,826,706 B2 | 11/2010 | Vongseng et al. |
| 7,841,775 B2 | 11/2010 | Smith et al. |
| 7,844,159 B2 | 11/2010 | Solheid et al. |
| 7,844,161 B2 | 11/2010 | Reagan et al. |
| 7,853,112 B2 | 12/2010 | Zimmel et al. |
| 7,873,255 B2 | 1/2011 | Reagan et al. |
| 7,980,768 B2 | 7/2011 | Smith et al. |
| 7,995,894 B2 | 8/2011 | Solheid et al. |
| 8,184,940 B2 | 5/2012 | Smith et al. |
| 8,210,756 B2 | 7/2012 | Smith et al. |
| 8,285,103 B2 | 10/2012 | Reagan et al. |
| 8,346,045 B2 | 1/2013 | Zimmel et al. |
| 8,374,476 B2 | 2/2013 | Reagan et al. |
| 8,401,357 B2 | 3/2013 | Solheid et al. |
| 2003/0103750 A1 * | 6/2003 | Laporte et al. ................ 385/134 |
| 2003/0185515 A1 * | 10/2003 | Lubkert .................. G06F 1/266 |
| | | 385/48 |
| 2004/0213234 A1 * | 10/2004 | Koch ................ H04L 29/12283 |
| | | 370/392 |
| 2005/0105873 A1 * | 5/2005 | Reagan et al. ................ 385/135 |
| 2006/0008231 A1 * | 1/2006 | Reagan et al. ................ 385/135 |
| 2006/0029390 A1 * | 2/2006 | Schmuck ........... G01M 11/3136 |
| | | 398/33 |
| 2007/0031100 A1 * | 2/2007 | Garcia et al. ................ 385/135 |
| 2007/0195693 A1 | 8/2007 | Li |
| 2007/0274720 A1 * | 11/2007 | Menasco, Jr. ...... H04Q 11/0067 |
| | | 398/66 |
| 2008/0025725 A1 | 1/2008 | Jette et al. |
| 2008/0138063 A1 * | 6/2008 | Akasaka ................. H04J 14/02 |
| | | 398/4 |
| 2009/0087181 A1 * | 4/2009 | Gray ....................... H04L 12/10 |
| | | 398/58 |
| 2009/0110359 A1 * | 4/2009 | Smith .................. G02B 6/4452 |
| | | 385/135 |
| 2009/0294016 A1 | 12/2009 | Sayres et al. |
| 2009/0317047 A1 * | 12/2009 | Smith .................. G02B 6/4452 |
| | | 385/135 |
| 2010/0074267 A1 * | 3/2010 | Ladd .................... H04L 12/2801 |
| | | 370/401 |
| 2010/0098407 A1 * | 4/2010 | Goswami ............. H04B 10/032 |
| | | 398/5 |
| 2010/0142888 A1 * | 6/2010 | Graff et al. ..................... 385/24 |
| 2010/0226654 A1 * | 9/2010 | Smith et al. .................. 398/116 |
| 2010/0329624 A1 * | 12/2010 | Zhou et al. ................... 385/135 |
| 2011/0026894 A1 * | 2/2011 | Rudenick et al. ............ 385/135 |
| 2011/0044693 A1 * | 2/2011 | Kelly ..................... H04B 10/40 |
| | | 398/116 |
| 2011/0091170 A1 * | 4/2011 | Bran de Leon et al. ..... 385/100 |
| 2011/0158598 A1 * | 6/2011 | LeBlanc et al. .............. 385/135 |
| 2011/0222831 A1 * | 9/2011 | Cao et al. ..................... 385/135 |
| 2011/0274403 A1 * | 11/2011 | LeBlanc et al. .............. 385/135 |
| 2013/0028566 A1 | 1/2013 | Smith et al. |
| 2013/0064508 A1 * | 3/2013 | Kelly .................. G02B 6/3825 |
| | | 385/56 |
| 2013/0064510 A1 | 3/2013 | Smith et al. |
| 2013/0114937 A1 | 5/2013 | Zimmel et al. |
| 2013/0148956 A1 * | 6/2013 | Khotimsky .......... H04B 10/032 |
| | | 398/2 |
| 2013/0216187 A1 * | 8/2013 | Dowling ......................... 385/71 |
| 2014/0105539 A1 * | 4/2014 | Conner et al. .................. 385/24 |

OTHER PUBLICATIONS

European Search Report for Application No. 12860025.1 dated Jun. 26, 2015.

* cited by examiner

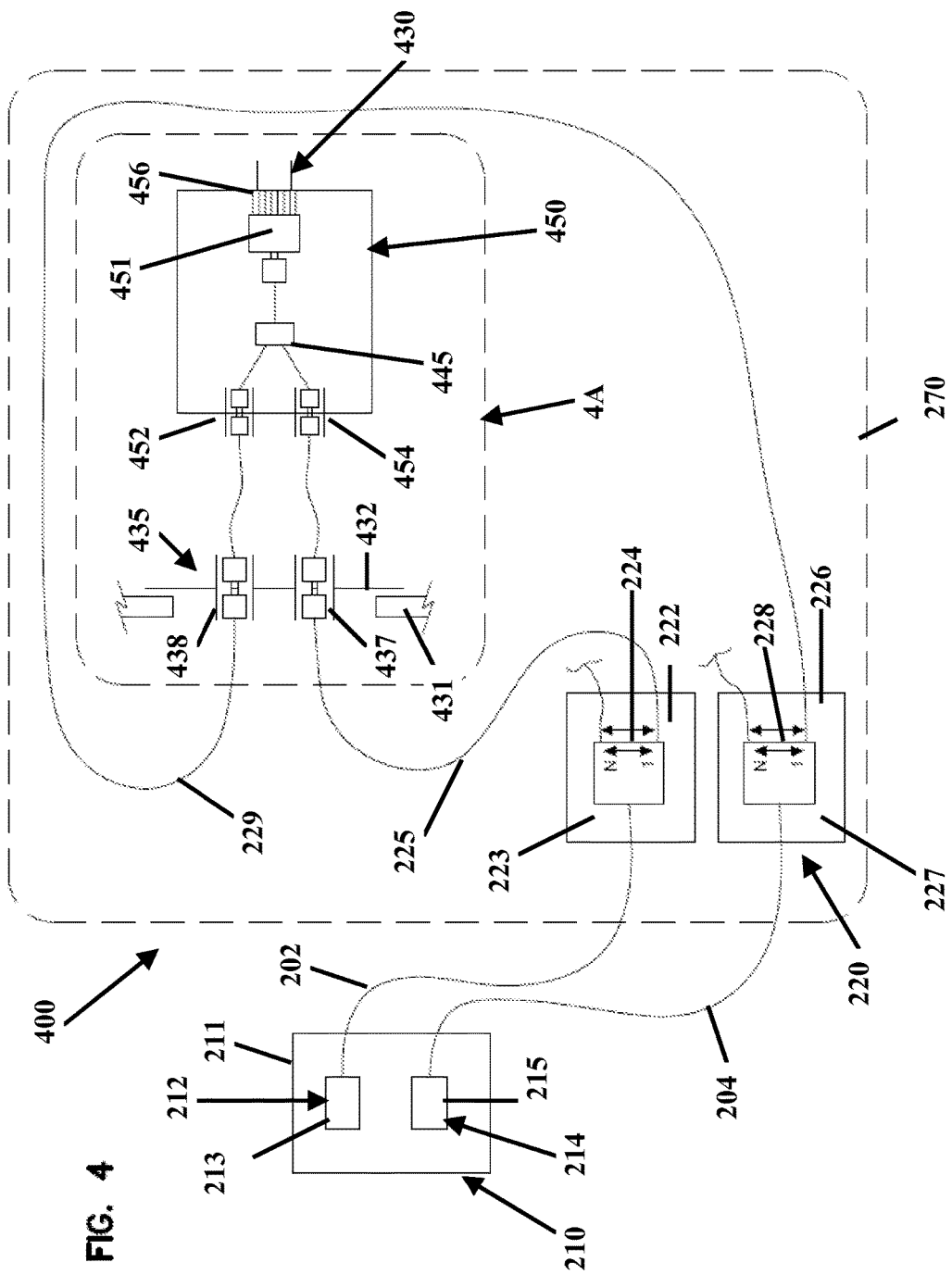

FIBER OPTIC WALL PLATE WITH REDUNDANCY SYSTEM

CROSS-REFERENCE TO RELATED APPLICATION

This application claims the benefit of U.S. Provisional Patent Application Ser. No. 61/579,334, filed Dec. 22, 2011, which application is hereby incorporated by reference in its entirety.

BACKGROUND

Passive Optical Networks (e.g. Indoor Passive Optical Networks) are becoming prevalent in part because service providers want to deliver high bandwidth communication capabilities to customers. Passive optical networks are a desirable choice for delivering high-speed communication data because they may not employ active electronic devices, such as amplifiers, repeaters, and work group switches, between a central office, data center, or equipment room and a subscriber termination or user device. The absence of active electronic devices may decrease network complexity and/or cost and may increase network reliability.

Many companies have a maximum allowed downtime per year. That downtime can be anywhere from a few minutes to a few days. When the allowable downtime is exceeded, the costs can be enormous. The allowable downtime is usually planned downtime and does not allow for downtime as a result of failure. To help alleviate this problem, systems designers create redundancy so that there is a back-up path and electronics to keep the system going in the event of failure. The head-end electronic equipment may have the ability to sense a path failure and to automatically activate the redundant path.

FIG. 1 illustrates an example network 100 deploying passive fiber optic lines. As shown, the network 100 can include a central office 101 that connects a number of end subscribers (also called end users herein) in a network. For example, the network 100 may connect head end electronics at the central office 101 to one or more wall plates 150 at subscriber locations 105. Near end electronics may be connected to the wall plates 150 using one or more optical patch cords. The central office 101 can additionally connect to a larger network such as the Internet (not shown) and/or a public switched telephone network (PSTN).

One or more of the end subscriber locations 105 may be disposed in a multi-dwelling unit (MDU) 110. The MDU 110 can include a fiber distribution hub (FDHs) 120 that may accept a primary feeder cable FP including one or more incoming fibers and a back-up feeder cable FB including the same number of incoming fibers. The FDH 120 may split or optically couple the incoming fibers of the primary feeder cable FP to individual subscriber distribution fibers SD that may be associated with end user locations 105. The FDH 120 also may split or optically couple the incoming fibers of the back-up feeder cable FB to the individual subscriber distribution fibers SD.

In general, primary and back-up lines cooperate to define redundant paths to an example subscriber location 105. As shown in FIG. 1, a first subscriber distribution fiber SD1 is routed along a first path P1 from the FDH 120 to an example wall plate 150 at an example subscriber location 105. A second subscriber distribution fiber SD2 is routed along a second path P2 from the FDH 120 to the example wall plate 150 at the subscriber location 105. In the passive optical network 100, the primary optical path P1 and the back-up path P2 each use a dedicated port 152, 154 on the wall plate 150.

A near end electronic device 140 connects to the primary port 152 using an optical patch cord PC to receive the optical signals carried over the first subscriber distribution line SD2. The near end electronic device 140 may include a media converter 145 that converts the optical signals to electrical signals. For example, the converter 145 may output the electrical signals (e.g., along four twisted pair wires 148) to electrical contacts (e.g., spring contacts of an RJ-jack). When a failure occurs, the optical patch cord PC connecting the wall plate 150 to the near end electronic device 140 has to be switched manually from the primary port 152 to the back-up port 154 to allow the electronic device 140 to receive optical signals from the second subscriber distribution line SD1.

Such manual switching increases the downtime when a failure occurs. Further, such manual switching may introduce dirt or other contaminants into the optical path, which also may increase downtime to clean and verify the path. Also, such manual switching can cause delays associated with negotiation between electronic components of the system. In view of the above, other types of redundancy systems are desirable.

SUMMARY

Primary and back-up lines of a passive optical network cooperate to define redundant pathways to at least one subscriber location. The disclosure relates to improving reliability in such passive optical networks through an automatic switchover from the primary line to the back-up line at the subscriber location.

Some aspects of the disclosure are directed to an example method for using an optical splitter/coupler to provide primary and back-up service to a subscriber network access location. The optical splitter/coupler includes first and second optical fibers that are optically coupled to a third optical fiber. The method includes optically coupling the first and second optical fibers of the optical splitter/coupler to a service provider location; and coupling the third optical fiber to the subscriber network access location.

Other aspects of the disclosure are directed to an example method for providing primary and back-up service to a network access location of a subscriber location. The method includes combining a primary line and separate back-up line into a combined line at an optical coupling location, and routing the combined line from the coupling location toward the network access location of the subscriber location.

Other aspects of the disclosure are directed to an example telecommunications device including a wall plate; and an optical splitter device integrated with the wall plate. The optical splitter device includes first, second and third ports that are optically coupled such that: a) optical signals input through the first port are output through the third port; b) optical signals input through the second port are output through the third port; and c) optical signals input through the third port are split within the splitter device and output through the first and second ports. The first and second ports are accessible from the back side of the wall plate and the third port is accessible from a front side of the wall plate.

Other aspects of the disclosure are directed to an example fiber optic network architecture including an optical splitter/coupler having first and second signal input/output locations that optically couple to a service provider location and a third signal input/output location that couples to a subscriber location. The first and second signal input/output locations are both optically coupled to the third signal input/output location.

BRIEF DESCRIPTION OF THE DRAWINGS

FIG. 4 shows another passive fiber optic network having features that are examples of inventive aspects in accordance with the features of the present disclosure including an example optical splitter/coupler disposed at near end electronics that plug into a wall outlet at a subscriber network access location that receives redundant subscriber cables forming redundant pathways.

DETAILED DESCRIPTION

In general, an example fiber optic network architecture configured in accordance with the principles of the present disclosure includes redundant pathways extending between a service provider and a subscriber network access location. The network architecture includes an optical splitter/coupler disposed at the subscriber network access location. The optical splitter/coupler optically couples two lines from the service provider to a port at the subscriber network access location.

Figure 1:
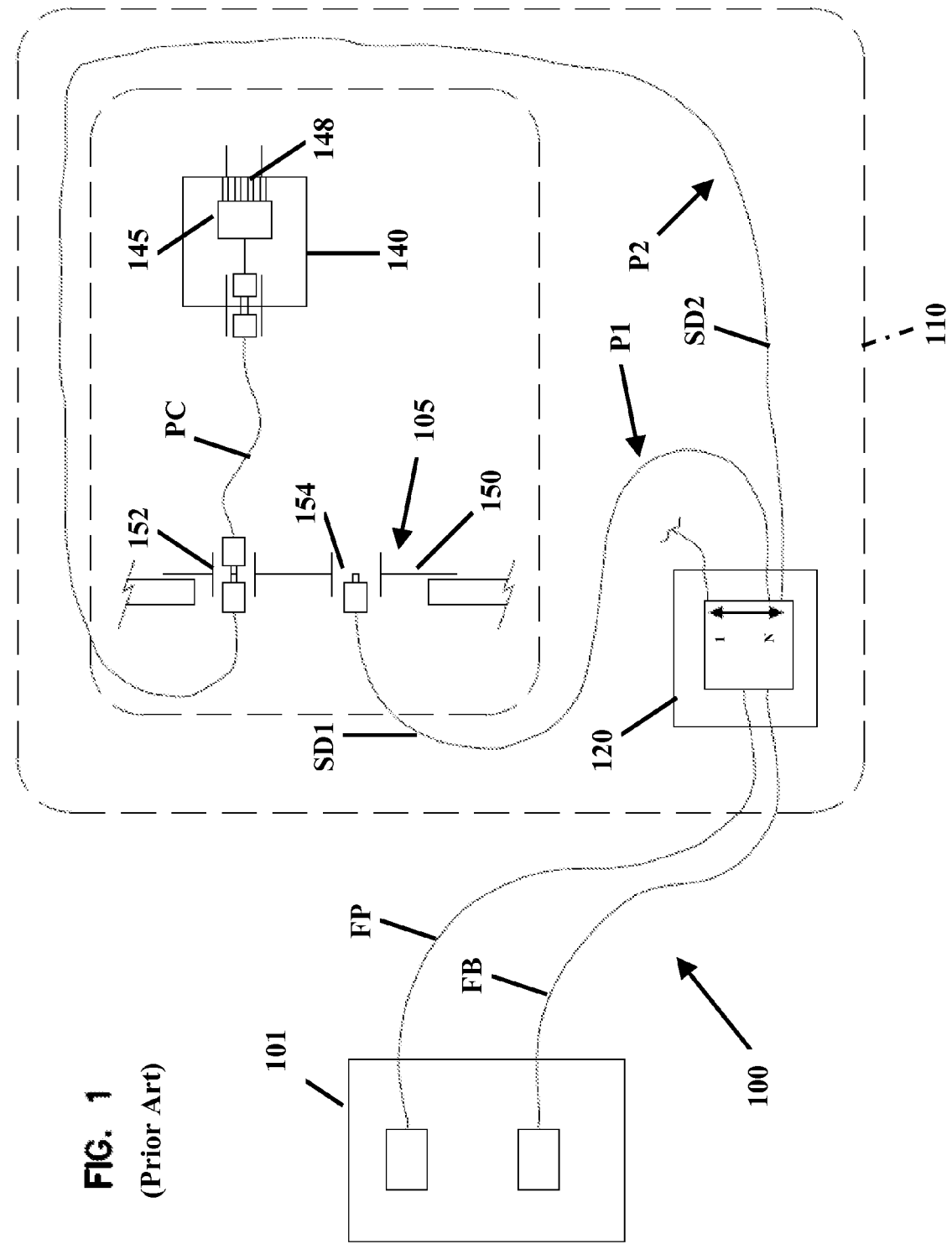
FIG. 1 shows a passive fiber optic network having redundant cable routing paths to an example subscriber network access location.
Figure 2:
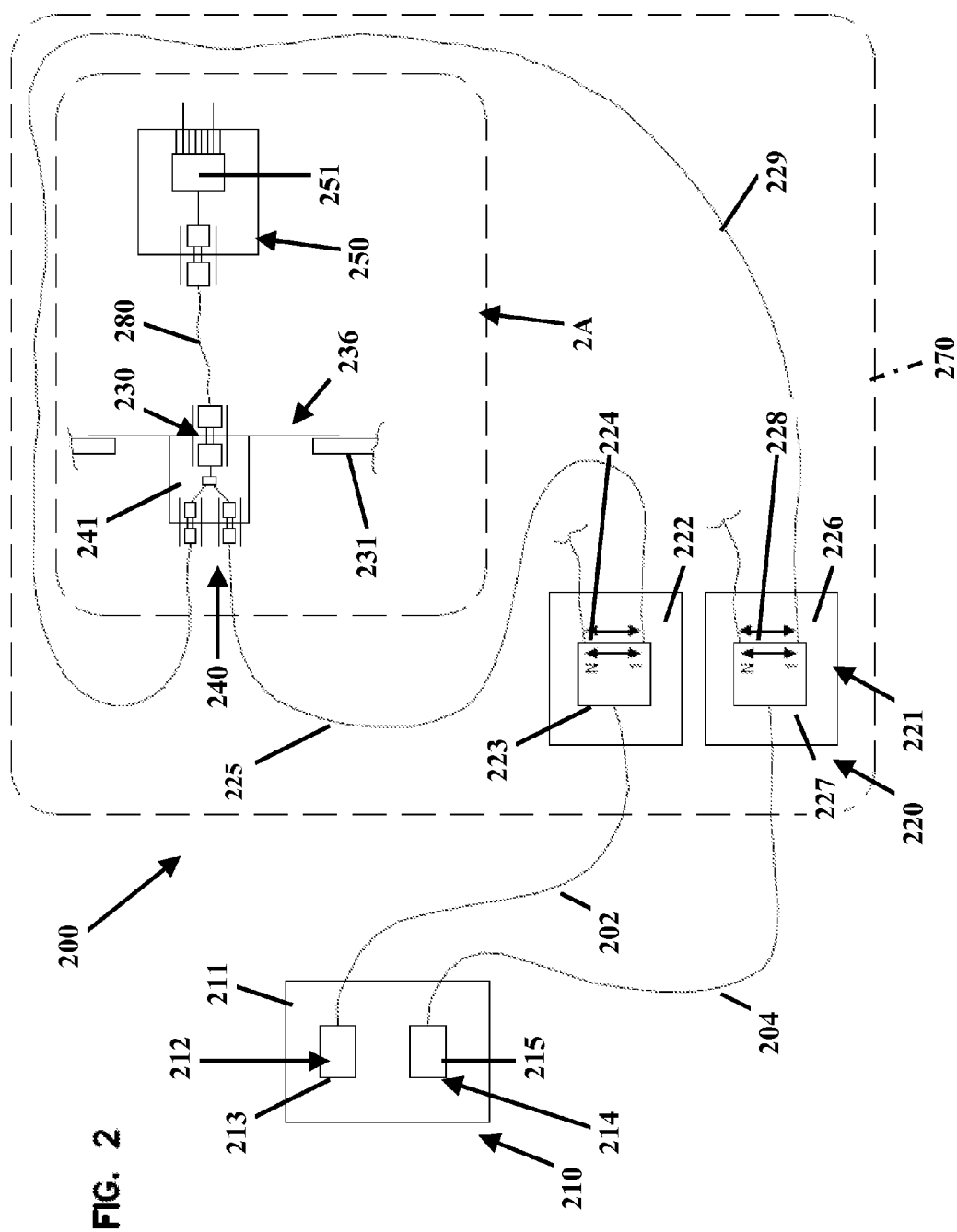
FIG. 2 shows another passive fiber optic network having features that are examples of inventive aspects in accordance with the features of the present disclosure including an example optical splitter/coupler disposed at a subscriber network access location and receiving redundant subscriber cables output from separate splitters to form redundant pathways to the subscriber network access location.

FIG. 2 is a schematic diagram showing one example passive fiber optic network 200 having features that are examples of inventive aspects in accordance with the features of the present disclosure. The example network 200 includes service lines extending between a service provider location 210 and multiple subscriber network access locations 230 at one or more subscriber locations 270. For ease in viewing, only a portion of the example network 200 including one of the network access locations 230 at a first subscriber location 270 is shown in the diagram of FIG. 2.

A central office 211 is disposed at the service provider location 210. The central office 211 includes a first optical signal source 212 and a second optical signal source 214. One of these optical signal sources 212, 214 functions as a primary signal source and the other of these optical signal sources 212, 214 functions as a back-up signal source. In certain implementations, the first optical signal source 212 includes a first optical line terminal 213 and the second optical signal source 214 includes a second optical line terminal 215. Under normal operating conditions, only the first optical signal source 212 is activated to provide optical signals to the network 200. The second optical signal source 213 is activated upon failure of the primary line.

A primary feeder cable 202 and a back-up feeder cable 204 extend from the central office 211 to a splitting location 220. For example, the primary feeder cable 202 may extend from the first optical line terminal 213 and the back-up feeder cable 204 may extend from the second optical line terminal 215. Each of the feeder cables 202, 204 includes at least one optical fiber. In certain implementations, each of the feeder cables 202, 204 includes multiple optical fibers. In certain implementations, each of the feeder cables 202, 204 includes multiple cables connected together across the network 200 between the central office 211 and the splitting location 220.

Typically, the primary feeder cable 202 carries optical signals from the first optical line terminal 213 towards the splitting location 220 (and vice versa). When a problem occurs in the primary line, the second optical terminal 215 begins sending/receiving optical signals over the back-up feeder cable 204. For example, the back-up feeder cable 204 may be used if the first optical line terminal 213 malfunctions. The back-up feeder cable 204 also may be used if there is a fault in the primary line (i.e., in the primary feeder cable 202 or a cable connected thereto).

At the splitting location 220, any optical signals carried over the feeder cables 202, 204 are split onto splitter output fibers 224, 228, respectively. In some implementations, the splitting location 220 includes at least one fiber distribution hub 221. In the example shown in FIG. 2, the first feeder cable 202 is routed to a first fiber distribution hub 222 and the second feeder cable 204 is routed to a second fiber distribution hub 226 at the splitting location 220. Each distribution hub 222, 226 includes at least a first distribution splitter/coupler (i.e., passive optical power splitters) 223, 227 that is configured to receive any optical signals carried over the respective feeder cable 202, 204 and to split the optical signals at a 1 to N split ratio onto the splitter output fibers 224, 228. At least one fiber 225, 229 of each of the splitter output fibers 224, 228 is routed to one of the subscriber access locations 230.

In some implementations, the splitter/couplers 223, 227 have a one by four split ratio. In other implementations, the splitter/couplers 223, 227 have a one by six split ratio. In other implementations, the splitter/couplers 223, 227 have a one by eight split ratio. In other implementations, the splitter/couplers 223, 227 have a one by sixteen split ratio. In other implementations, the splitter/couplers 223, 227 have a one by thirty-two split ratio. In other implementations, the splitter/couplers 223, 227 have a one by sixty-four split ratio.

The splitting location 220 is disposed at an intermediate point between the service provider location 210 and the subscriber network access locations 230. In certain implementations, the splitting location 220 is located near the subscriber location 270. For example, the splitting location 220 may be disposed in the same building as one or more of the subscriber network access locations 230. In certain implementations, the splitting location 220 and the subscriber network access location 230 may both be located in a multi-dwelling unit (MDU) 270. For example, the splitting location 220 may be disposed in a basement of the MDU 270 and one or more network access locations 230 may be defined by wall outlet devices 245 disposed at wall outlets 236 located on different floors of the MDU 270. The wall outlets 236 can be at different units/residences of the MDU 270.

Figure 2A:
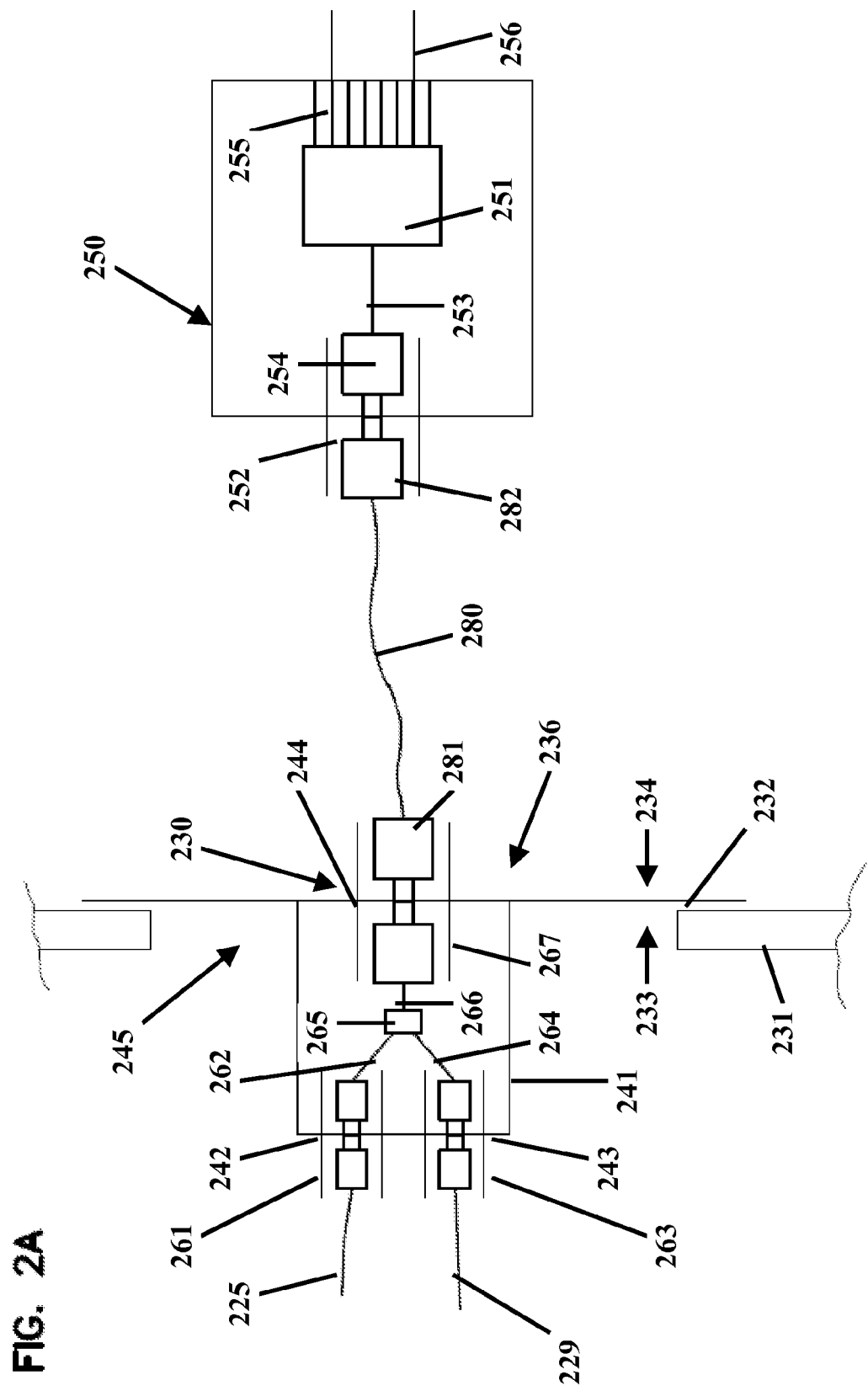
FIG. 2A is an enlarged view of the section of FIG. 2 designated 2A.

One example wall outlet device 245 is shown in detail in FIG. 2A. The wall outlet device 245 includes a wall plate 232 and an optical splitter/coupler device 241. In certain implementations, the wall plate 232 and optical splitter/coupler device 241 form a compact unit that mounts at the wall outlet 236 to define a "smart" faceplate. The wall plate 232 is mounted to a front side of a wall 231 (e.g., within one of the units/residences of the MDU 270). The wall plate 232 defines a back side 233 facing towards the wall 231 and a front side 234 facing away from the wall 231. The wall plate 232 defines at least one input/output port 244 (e.g., defined by a fiber optic adapter) configured to provide access to the optical splitter/coupler device 241 from the front side 234 of the wall plate 232.

The optical splitter/coupler device 241 has a first input/output port 242, a second input/output port 243, and a third input/output port 244. The optical splitter/coupler device 241 includes a splitter 265 (e.g., a passive optical power splitter) that is configured to split signals received at the third input/output port 244 to the first and second input/output ports 242, 243. The splitter 265 also passes the optical signals received at the first and second input/output ports 242, 243 to the third input/output port 244. A first internal optical fiber 262 extends from the splitter 265 towards the first input/output port 242. A second internal optical fiber 264 extends from the splitter 265 towards the second input/output port 243. A third internal optical fiber 266 extends from the splitter 265 towards the third input/output port 244.

The splitter output fiber 225, which is optically coupled to the first feeder cable 202, is received at the first input/output port 242. For example, an optical adapter 261 may be disposed at the first input/output port 242. In such implementations, a connectorized end of the splitter output fiber 225 may be plugged into one end of the optical adapter 261 and a connectorized end of the first internal fiber 262 may be plugged into the other end of the optical adapter 261. A second optical adapter 263 may be disposed at the second input/output port 243. In such implementations, a connectorized end of the splitter output fiber 229 may be plugged into one end of the second optical adapter 263 and a connectorized end of the second internal fiber 264 may be plugged into the other end of the second optical adapter 263. In other implementations, the splitter output fibers 225, 229 may be spliced to fibers extending from the first and second input/output ports 242, 243.

A third adapter 267 may be disposed at the third input/output port 244 of the optical splitter/coupler device 241. A connectorized end of the third internal fiber 266 may be plugged into one side of the third adapter 267. The third adapter 267 extends through the input/output port 244, thereby providing access to the other end of the adapter 267. The splitter/coupler device 241 receives optical signals carried by either of the first and second splitter output fibers 225, 229 and outputs the received optical signals to the third port 244 disposed at the wall plate. The splitter/coupler device 241 also splits any optical signals received at the third port 244 towards both the first and second input/output ports 242, 243. Accordingly, the wall outlet device 245 defines an optical coupling location 240 within the network 200 wherein the optical signals are split when moving from the subscriber locations 270 towards the central office 211.

The subscriber has subscriber equipment 250 including a conversion package 251 that converts between optical signal and electrical signals. For example, the subscriber equipment 250 may include an optical network terminal (e.g., a network interface device). The subscriber equipment 250 includes a first input/output port defined by an adapter 252.

At least one internal fiber 253 extends from the conversion package 251 and a connectorized end 254 of the internal fiber 253 is plugged into one end of the adapter 252. Electrical leads 255 extend from the conversion package 251 towards one or more electrical contacts 256. In certain implementations, the electrical contacts 256 define an RJ-type port. In one example implementations, the electrical contacts 256 define an RJ-45 port. In another example implementation, the electrical contacts 256 define a mini-USB port. In the example shown in FIG. 2A, eight wires 255 corresponding to four twisted pairs extend from the conversion package 251 to an electrical connection socket (e.g., an RJ jack).

A first connectorized end 281 of a patch cord 280 may be plugged into the third adapter 267 through the optical port 244 at the wall plate 232. A second connectorized end 282 of the patch cord 280 may be plugged into the adapter 252 of the subscriber equipment 250 to interface with the connectorized end 254 of the internal fiber 253. The patch cord 280 carries optical signals supplied from the network 200 to the conversion package 251 to be converted to electrical signals. The patch cord 280 also carries converted optical signals from the subscriber back to the network 200. Accordingly, in certain implementations, the subscriber network access location 230 is defined by the input/output port 244 at the wall plate 232.

A process for providing primary and back-up service to a network access location 230 of a subscriber location 270 in network 200 includes combining a primary line and a separate back-up line into a combined line at an optical coupling location 240 and routing the combined line from the coupling location 240 toward the network access location 230 of the subscriber location 270. The combined line eliminates the need for switching over patch cords in the event of a failure. In certain implementations, the process may include providing an optical splitter/coupler 241 including first and second optical paths 262, 264 that are optically coupled to a third optical path 266 (FIG. 2A). The process also may include optically coupling the first and second optical paths 262, 264 of the optical splitter/coupler 241 to a service provider location 210; and coupling the third optical path 266 to the subscriber network access location 230. Upon failure of a primary system source coupled to the first optical path 262, a back-up signal source coupled to the second optical path 264 can be activated and automatically routed by the splitter/coupler 241 towards the network access location 230 via the third optical path 266.

For example, a wall outlet device 245 may be disposed behind a wall 231 at a subscriber location. The wall outlet device 245 includes a wall plate 232 and an optical splitter/coupler device 241 as described above. In one example embodiment, the optical splitter/coupler device 241 is a 2:1 optical power splitter. First and second splitter output fibers 225, 229, which carry optical signals from the first and second feeder cables 202, 204, respectively, are routed to the rear side 233 of the wall plate 232 and optically coupled (e.g., via a fusion splice, an optical adapter, etc.) to the first and second optical paths 262, 264 of the optical splitter/coupler device 241. A patch cord 280 is plugged into the third input/output port 244 of the wall outlet device 245 to optically couple the both the primary line and the back-up line to subscriber equipment 250.

Figure 3:
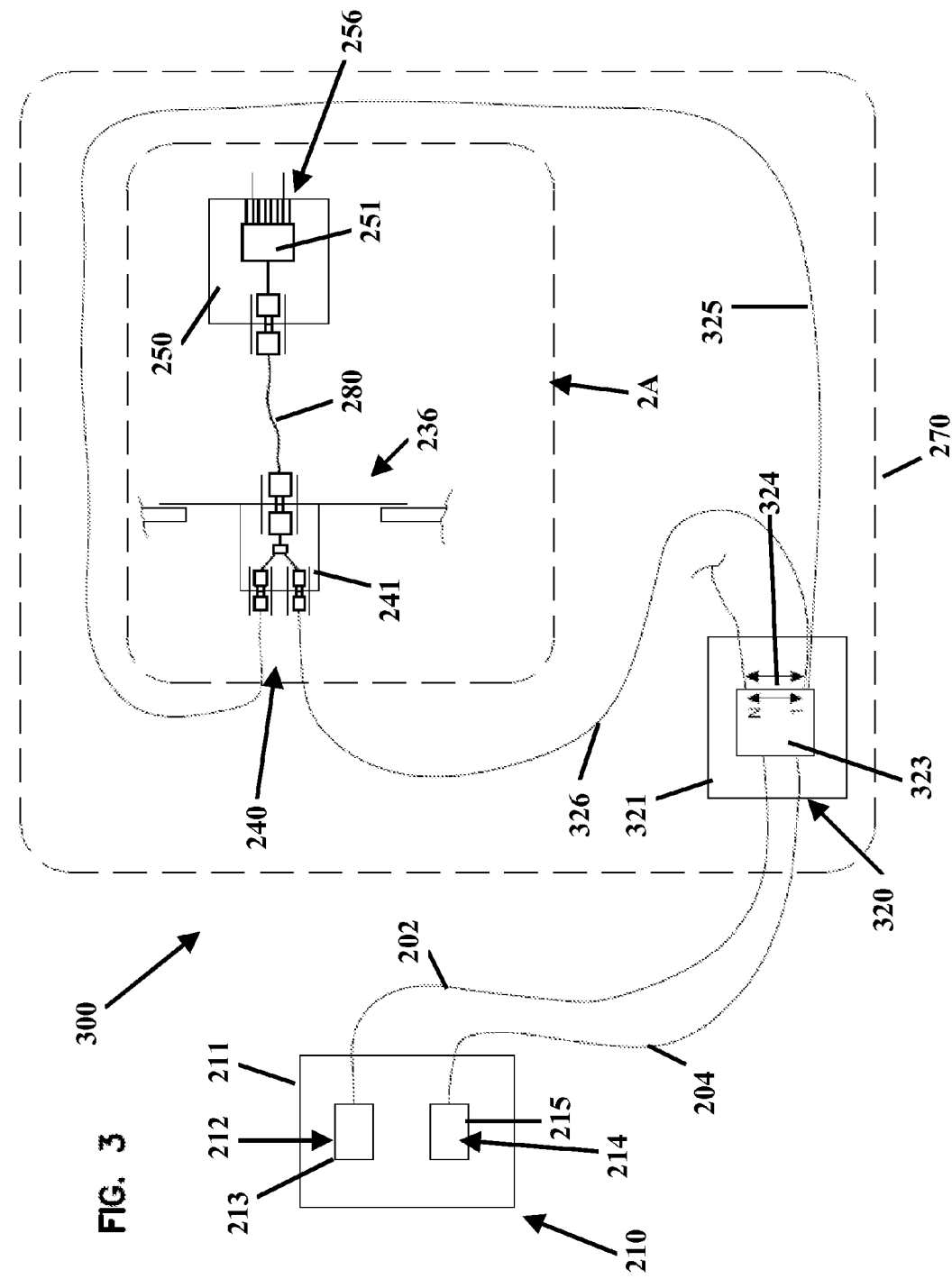
FIG. 3 shows another passive fiber optic network having features that are examples of inventive aspects in accordance with the features of the present disclosure including an example optical splitter/coupler disposed at a subscriber network access location and receiving redundant subscriber cables output from the same splitter to form redundant pathways to the subscriber network access location.

FIG. 3 is a schematic diagram showing another example passive fiber optic network 300 having features that are examples of inventive aspects in accordance with the features of the present disclosure. The example network 300 also includes service lines extending between a service provider location 210 and multiple subscriber network access locations 230 at one or more subscriber locations 270. For ease in understanding, common elements of networks 200, 300 share common reference numbers. Also, only a portion of the example network 300 including one of the network access locations 230 at a first subscriber location 270 is shown in the diagram of FIG. 3.

The central office 211 at the service provider location 210 includes a first optical signal source 212 and a second optical signal source 214. One of these optical signal sources 212, 214 functions as a primary signal source and the other of these optical signal sources 212, 214 functions as a back-up signal source. A primary feeder cable 202 and a back-up feeder cable 204 extend from the central office 211 to a splitting location 320. Typically, the primary feeder cable 202 carries optical signals from the first optical line terminal 213 towards the splitting location 320 (and vice versa). When a problem occurs in the primary line, the second optical terminal 215 begins sending/receiving optical signals over the back-up feeder cable 204. For example, the back-up feeder cable 204 may be used if the first optical line terminal 213 malfunctions. The back-up feeder cable 204 also may be used if there is a fault in the primary line (i.e., in the primary feeder cable 202 or a cable connected thereto).

At the splitting location 320, optical signals carried over the feeder cables 202, 204 are split onto splitter output fibers 224. In the example shown in FIG. 3, both feeder cables 202, 204 are routed to one fiber distribution hub 321 at the splitting location 320. In some implementations, the fiber distribution hub 321 includes multiple optical splitters 323. In other implementations, the fiber distribution hub 321 includes one splitter/coupler 323. The splitter/coupler 323 is configured to receive optical signals carried over the feeder cables 202, 204 and to split the optical signals onto the splitter output fibers 324. The splitter output fibers 324 include a primary output fiber 325 and a back-up output fiber 326, both of which are routed to one of the subscriber access locations 230.

Some example splitter/couplers 323 couple multiple input fibers to multiple output fibers. For example, the optical splitter/coupler 323 may be a two-to-many splitter. In some implementations, the splitter/couplers 223, 227 have a two by four split ratio. In other implementations, the splitter/couplers 223, 227 have a two by six split ratio. In other implementations, the splitter/couplers 223, 227 have a two by eight split ratio. In other implementations, the splitter/couplers 223, 227 have a two by sixteen split ratio. In other implementations, the splitter/couplers 223, 227 have a two by thirty-two split ratio. In other implementations, the splitter/couplers 223, 227 have a two by sixty-four split ratio. In other implementations, the splitter/couplers 223, 227 have a two by seventy-six split ratio. In other implementations, the splitter/couplers 223, 227 have a two by 128 split ratio.

The splitting location 320 is disposed at an intermediate point between the service provider location 210 and the subscriber network access locations 230. In certain implementations, the splitting location 320 is located near or at the subscriber location. For example, the splitting location 320 may be disposed in the same building as one or more of the subscriber network access locations 230. In certain implementations, the splitting location 320 and the subscriber network access location 230 may both be located in a multi-dwelling unit (MDU) 270. For example, the splitting location 320 may be disposed in a basement of the MDU 270 and one or more network access locations 230 may be disposed at wall outlets 236 located on different floors of the MDU 270. The wall outlets 236 can be at different units/residences of the MDU 270.

In certain example implementations, the splitter location 320 may be defined by the example wall outlet device 245 shown in FIG. 2A. The splitter output fiber 325, which is optically coupled to the first feeder cable 202, is received at the first input/output port 242 of the wall outlet device 245. For example, a connectorized end of the splitter output fiber 325 may be plugged into one end of the optical adapter 261 of the wall outlet device 245. The splitter output fiber 326, which is optically coupled to the second feeder cable 204, is received at the second input/output port 243 of the wall outlet device 245. For example, a connectorized end of the splitter output fiber 326 may be plugged into one end of the optical adapter 263 of the wall outlet device 245. In other implementations, the splitter output fibers 325, 326 may be spliced to fibers extending from the first and second input/output ports 242, 243.

A process for providing primary and back-up service to a network access location 230 of a subscriber location 270 in network 300 includes combining a primary line and a separate back-up line into a combined line at an optical coupling location 240 and routing the combined line from the coupling location 240 toward the network access location 230 of the subscriber location 270. In certain implementations, the process may include providing an optical splitter/coupler 241 including first and second optical paths 262, 264 that are optically coupled to a third optical path 266 (FIG. 2A). The process also may include optically coupling the first and second optical paths 262, 264 of the optical splitter/coupler 241 to a service provider location 210; and coupling the third optical path 266 to the subscriber network access location 230.

For example, a wall outlet device 245 may be disposed behind a wall 231 at a subscriber location. The wall outlet device 245 includes a wall plate 232 and an optical splitter/coupler device 241 as described above. In one example embodiment, the optical splitter/coupler device 241 is a 2:1 optical power splitter. First and second splitter output fibers 325, 326, which carry optical signals from the splitting/coupling location 320, are routed to the rear side 233 of the wall plate 232 and optically coupled (e.g., via a fusion splice, an optical adapter, etc.) to the first and second optical paths 262, 264 of the wall outlet device 245. A patch cord 280 is plugged into the third input/output port 244 of the wall outlet device 245 to optically couple the both the primary line and the back-up line to subscriber equipment 250.

FIG. 4 is a schematic diagram showing one example passive fiber optic network 400 having features that are examples of inventive aspects in accordance with the features of the present disclosure. The example network 400 includes service lines extending between a service provider location 210 and multiple subscriber network access locations 430 at one or more subscriber locations 470. For ease in viewing, only a portion of the example network 400 including one of the network access locations 430 at a first subscriber location 470 is shown in the diagram of FIG. 4.

A central office 211 is disposed at the service provider location 210. The central office 211 includes a first optical signal source 212 and a second optical signal source 214. One of these optical signal sources 212, 214 functions as a primary signal source and the other of these optical signal sources 212, 214 functions as a back-up signal source. In certain implementations, the first optical signal source 212 includes a first optical line terminal 213 and the second optical signal source 214 includes a second optical line terminal 215. Under normal operating conditions, only the first optical signal source 212 is activated to provide optical signals to the network 200. The second optical signal source 213 is activated upon failure of the primary line.

A primary feeder cable 202 and a back-up feeder cable 204 extend from the central office 211 to a splitting location 220. For example, the primary feeder cable 202 may extend from the first optical line terminal 213 and the back-up feeder cable 204 may extend from the second optical line terminal 215. Each of the feeder cables 202, 204 includes at least one optical fiber. In certain implementations, each of the feeder cables 202, 204 includes multiple optical fibers. In certain implementations, each of the feeder cables 202, 204 includes multiple cables connected together across the network 200 between the central office 211 and the splitting location 220.

Typically, the primary feeder cable 202 carries optical signals from the first optical line terminal 213 towards the splitting location 220 (and vice versa). When a problem occurs in the primary line, the second optical terminal 215 begins sending/receiving optical signals over the back-up feeder cable 204. For example, the back-up feeder cable 204 may be used if the first optical line terminal 213 malfunctions. The back-up feeder cable 204 also may be used if there is a fault in the primary line (i.e., in the primary feeder cable 202 or a cable connected thereto).

At the splitting location 220, any optical signals carried over the feeder cables 202, 204 are split onto splitter output fibers 224, 228, respectively. In some implementations, the splitting location 220 includes at least one fiber distribution hub 221. In the example shown in FIG. 2, the first feeder cable 202 is routed to a first fiber distribution hub 222 and the second feeder cable 204 is routed to a second fiber distribution hub 226 at the splitting location 220. Each distribution hub 222, 226 includes at least a first distribution splitter/coupler (i.e., passive optical power splitters) 223, 227 that is configured to receive any optical signals carried over the respective feeder cable 202, 204 and to split the optical signals at a 1 to N split ratio onto the splitter output fibers 224, 228. At least one fiber 225, 229 of each of the splitter output fibers 224, 228 is routed towards one of the subscriber access locations 430.

In some implementations, the splitter/couplers 223, 227 have a one by four split ratio. In other implementations, the splitter/couplers 223, 227 have a one by six split ratio. In other implementations, the splitter/couplers 223, 227 have a one by eight split ratio. In other implementations, the splitter/couplers 223, 227 have a one by sixteen split ratio. In other implementations, the splitter/couplers 223, 227 have a one by thirty-two split ratio. In other implementations, the splitter/couplers 223, 227 have a one by sixty-four split ratio.

The splitting location 220 is disposed at an intermediate point between the service provider location 210 and the subscriber network access locations 430. In certain implementations, the splitting location 220 is located at the subscriber location 270. For example, the splitting location 220 may be disposed in the same building as one or more of the subscriber network access locations 430. In certain implementations, the splitting location 220 and the subscriber network access location 430 may both be located in a multi-dwelling unit (MDU) 270. For example, the splitting location 220 may be disposed in a basement of the MDU 270 and one or more network access locations 430 may be defined by one or more pieces of subscriber equipment 450 located on different floors of the MDU 270. The subscriber equipment 250 can be at different units/residences of the MDU 270.

The subscriber equipment 250 is configured to be plugged into the network 200 via a wall outlet 435 in the MDU 270 (e.g., in one of the units/residences of the MDU 270). One example wall outlet 435 is shown in detail in FIG. 4A. The wall outlet 435 includes a wall plate 432 mounted to a wall 431 in the MDU 270. The wall plate 432 defines a back side 433 facing towards the wall 431 and a front side 434 facing away from the wall 431. The wall plate 432 defines a first optical adapter 436 at which two fiber optic connectors are aligned and optically coupled. For example, a connectorized end of the first splitter output fiber 225, which carries optical signals from the primary feeder cable 202, is plugged into the rear side 433 of the first port 436. The wall plate 432 also defines a second optical adapter 438 at which another two fiber optic connectors are aligned and optically coupled. For example, a connectorized end of the second splitter output fiber 229, which carries optical signals from the back-up feeder cable 204, is plugged into the rear side 433 of the second port 437.

Figure 4A:
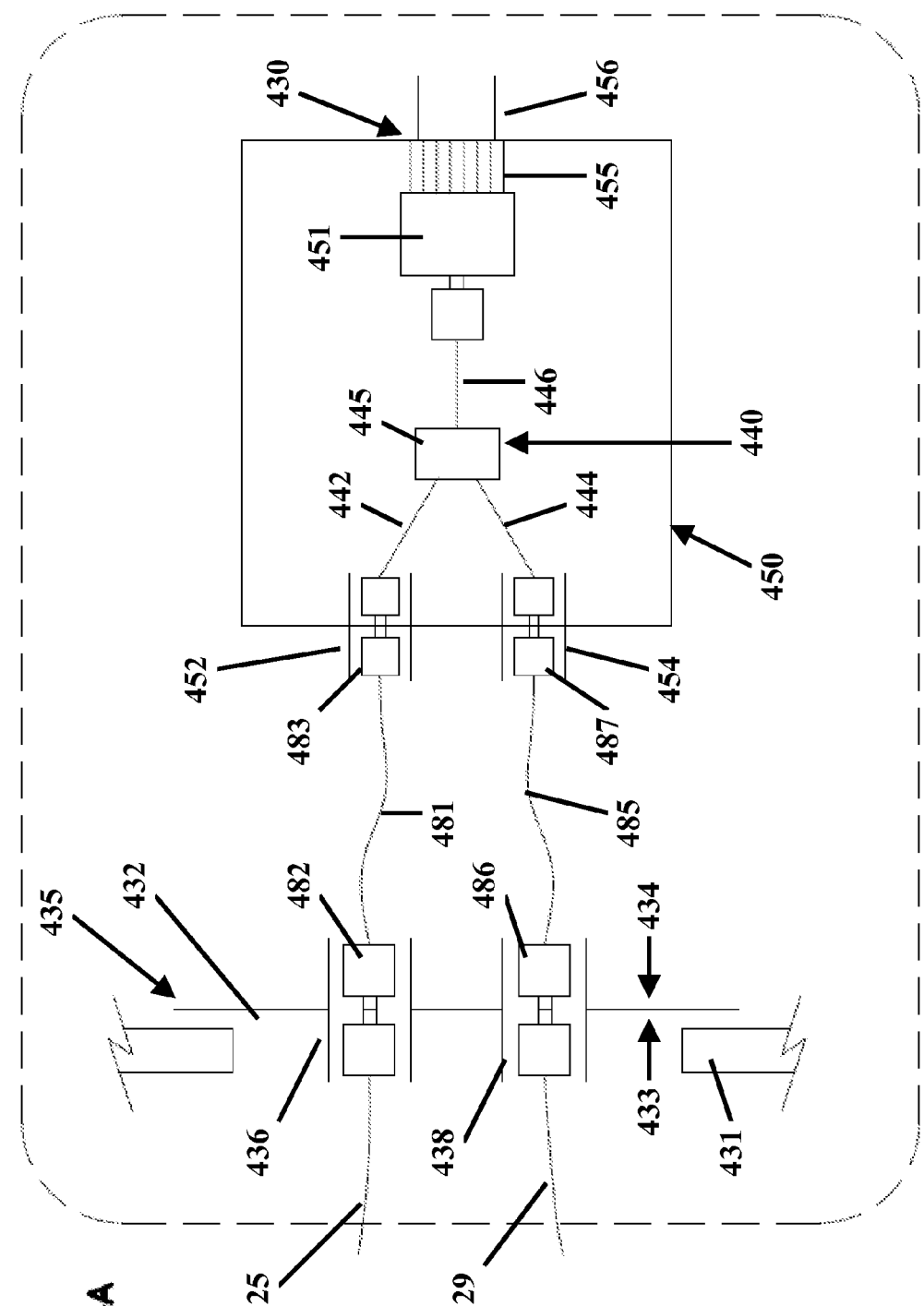
FIG. 4A is an enlarged view of the section of FIG. 4 designated 4A.

One example piece of subscriber equipment (e.g., a computer) 450 is shown in FIG. 4A. The subscriber equipment 450 includes a first input/output port 452 and a second input/output port 454 that are configured to receive optical signals. For example, the first input/output port 452 may be defined by a first optical adapter and the second input/output port 454 may be defined by a second optical adapter. A first patch cord 481 may connect the subscriber equipment 450 to the primary signal line. For example, a first connectorized end 482 of the patch cord 481 may be plugged into the front side 434 of the first port 436 of the wall outlet 435 and a second connectorized end 483 of the patch cord 481 may be plugged into one end of the adapter at the first input/output port 452 of the subscriber equipment 450. A second patch cord 485 may connect the subscriber equipment 450 to the back-up signal line. For example, a first connectorized end 486 of the second patch cord 485 may be plugged into the front side 434 of the second port 438 of the wall outlet 435 and a second connectorized end 487 of the second patch cord 485 may be plugged into one end of the adapter at the second input/output port 454 of the subscriber equipment 450.

A connectorized end of a first internal optical fiber 442 extends from an opposite end of the adapter at the first input/output port 452 towards an optical splitter (e.g., a passive optical power splitter) 445, which defines an optical coupling location 440. A connectorized end of a second internal optical fiber 444 extends from an opposite end of the adapter at the second input/output port 454 towards the optical splitter 445. A third internal optical fiber 446 extends from the optical splitter 445 towards an internal conversion package 451 included in the subscriber equipment 450. In certain implementations, a connectorized end of the third internal optical fiber 446 plugs into the conversion package 451.

The conversion package 451 converts between optical signal and electrical signals. Electrical leads 455 extend from the conversion package 451 towards one or more electrical contacts 456. In certain implementations, the electrical contacts 456 define an RJ-type port. In one example implementations, the electrical contacts 456 define an RJ-45 port. In another example implementation, the electrical contacts 456 define a mini-USB port. In the example shown in FIG. 4A, eight wires 455 corresponding to four twisted pairs extend from the conversion package 451 to an electrical connection socket (e.g., an RJ jack) 456. The electrical contacts 456 define the subscriber network access location 430, which automatically receives optical signals from the activated power source 213,215 at the central office.

The splitter 445 of the subscriber equipment 450 receives optical signals carried by either of the first and second splitter output fibers 225, 229 (via patch cords 481, 486, respectively) and outputs the received optical signals to the conversion package 451. The splitter/coupler device 241 also splits any optical signals received from the conversion package 451 towards both the first and second input/output ports 452, 454. Accordingly, the subscriber equipment 450 defines the optical coupling location 440 within the network 400 wherein the optical signals are split when moving from the subscriber network access location 430 towards the central office 411.

A process for providing primary and back-up service to a network access location 430 of a subscriber location 270 in network 400 includes combining a primary line and separate back-up line into a combined line at the optical coupling location 440 and routing the combined line from the coupling location 440 toward the network access location 430 of the subscriber location 270. In certain implementations, the process may include providing an optical splitter/coupler 445 including first and second optical paths 442, 444 that are optically coupled to a third optical path 446 (FIG. 4A). The process also may include optically coupling the first and second optical paths 442, 444 of the optical splitter/coupler 445 to a service provider location 210; and coupling the third optical path 446 to the subscriber network access location 430.

For example, a piece of subscriber equipment 450 may be disposed adjacent a wall outlet 435 at a subscriber location. First and second splitter output fibers 225, 229, which carry optical signals from the first and second feeder cables 202, 204, respectively, are routed to the rear side 233 of a wall plate 432 mounted at the wall outlet 435. The process includes plugging connectorized ends of the splitter output fibers 225, 229 into the rear side of adapters 436, 438 disposed at the wall plate 432. A patch cord 481 is plugged into the front side of the first adapter 436 of the wall outlet plate 432 and into a first adapter 452 at the subscriber equipment to optically couple the primary line to the subscriber equipment 450. A second patch cord 485 is plugged into the front side of the second adapter 438 of the wall outlet plate 432 and into a second adapter 454 at the subscriber equipment 450 to optically couple the back-up line to subscriber equipment 450.

The fiber optic adapters disclosed herein are configured to optically and mechanically couple together two optical connectors The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for using an optical splitter/coupler to provide primary and back-up service to subscriber network access port of at a wall plate, the optical splitter/coupler being provided on the wall plate, the optical splitter/coupler defining a first port, a second port, and the subscriber network access port, the first and second ports being disposed at a first side of the optical splitter/coupler and the subscriber network access port being disposed at an opposite second side of the optical splitter/coupler, the optical splitter/coupler passing optical signals received at the first and second ports to the subscriber network access port, the method comprising:

mounting the wall plate to a wall at the subscriber location so that the first and second ports of the optical splitter/coupler are accessible from an interior of the wall and the subscriber network access port is accessible from an exterior of the wall;

plugging a first connectorized end of a first subscriber distribution fiber into the first port of the optical splitter/coupler, the first distribution fiber defining a primary optical signal path; and plugging a second connectorized end of a second distribution fiber into a second port of the optical splitter/coupler, the second distribution fiber providing a back-up optical signal path such that two independent optical signal paths are provided to the subscriber network access port of the optical splitter/coupler at the wall plate.

2. The method of claim 1, wherein optical signals carried by the third optical fiber toward the subscriber network access location are routed through a network interface device which converts the optical signals to electrical signals which can be accessed by a subscriber at the subscriber network access location.

3. The method of claim 2, wherein the port is configured for receiving an electrical plug.

4. The method of claim 3, wherein the port is provided by an RJ jack.

5. The method of claim 1, wherein the first optical fiber is optically connected to a first optical signal source and the second optical fiber is optically connected to a second optical signal source.

6. The method of claim 5, wherein the first optical signal source and the second optical signal source are located at a central office of the service provider.

7. The method of claim 5, wherein the first and second optical signal sources comprise first and second optical line terminals.

8. The method of claim 1, wherein signals input to the optical splitter/coupler from the service provider location are optically split from one to many at a splitting location between the service provider location and the optical splitter/coupler, and wherein the signals are split from one to many as the signals travel from the service provider location toward the optical splitter /coupler.

9. The method of claim 8, wherein the splitting location comprises at least one fiber distribution hub.

10. The method of claim 8, wherein the splitting location includes a first distribution splitter/coupler having a plurality of outputs one of which corresponds to the first optical fiber and a second distribution splitter/coupler having a plurality of outputs one of which corresponds to the second optical fiber.

11. The method of claim 10, wherein the first and second distribution splitter/couplers each have a 1 by 32 split ratio.

12. The method of claim 11, wherein the first and second distribution splitter/couplers are respectively provided at first and second fiber distribution hubs.

13. The method of claim 1, wherein a patch cord is routed from the subscriber network access port to an optical network terminal where signals carried by the patch cord from the wall plate to the optical network terminal are converted from optical to electrical.

14. A method for providing primary and back-up service to a network access port of a subscriber location, the method comprising:

routing a primary line to a first interior port of a wall plate mounted to a wall at a subscriber location;

routing a separate back-up line to a second interior port of the wall plate;

optically coupling optical signals from the primary line and from the separate back-up line into a combined line at an optical splitter/coupler disposed between the wall plate and the network access port; and routing the combined line from the optical splitter/coupler toward the network access port of the subscriber location, the network access port being defined by a piece of subscriber equipment disposed at the subscriber location.

15. The method of claim 14, wherein the network access location is a port provided at the network interface terminal for receiving an electrical plug.

16. The method of claim 14, wherein the optical splitter/coupler is provided at a network interface device at the subscriber location, wherein the network interface device converts optical signals output from the optical splitter/coupler from optical to electrical.

\* \* \* \* \*